United States Patent [19]
Ishikawa

[11] Patent Number: 5,815,311
[45] Date of Patent: Sep. 29, 1998

[54] OPTICAL EQUIPMENT

[75] Inventor: Masuya Ishikawa, Tokyo, Japan

[73] Assignee: Hifumi Kogaku Kikai Kabushiki Kaisha, Tokyo, Japan

[21] Appl. No.: 776,910

[22] PCT Filed: Jun. 20, 1995

[86] PCT No.: PCT/JP95/01225

§ 371 Date: Feb. 3, 1997

§ 102(e) Date: Feb. 3, 1997

[87] PCT Pub. No.: WO97/01121

PCT Pub. Date: Jan. 9, 1997

[51] Int. Cl.[6] .......................... G02B 21/00; G02B 23/00
[52] U.S. Cl. .......................................... 359/381; 359/399
[58] Field of Search .......................... 359/362, 368–390, 359/503–505, 838

[56] References Cited

U.S. PATENT DOCUMENTS

| | | | |
|---|---|---|---|
| 1,128,761 | 2/1915 | Cornell | 359/381 |
| 4,284,327 | 8/1981 | Kraft et al. | 359/385 |
| 4,869,021 | 9/1989 | Gregory | 359/399 |
| 5,052,788 | 10/1991 | Tachibana | 359/399 |
| 5,515,201 | 5/1996 | Omi | 359/399 |
| 5,682,567 | 10/1997 | Spruck et al. | 359/381 |

FOREIGN PATENT DOCUMENTS

| | | |
|---|---|---|
| 386687B | 9/1988 | Austria . |
| 2447564 | 8/1980 | France . |
| 2902961 | 7/1980 | Germany . |
| 5100521 | 7/1980 | Japan . |
| 61-173912 | 8/1986 | Japan . |
| 6-186483 | 8/1994 | Japan . |
| 2041560 | 9/1980 | United Kingdom . |
| 2 217 471 | 10/1989 | United Kingdom ............ 359/399 |

*Primary Examiner*—Thong Nguyen
*Attorney, Agent, or Firm*—Joseph C. Mason, Jr.

[57] ABSTRACT

A telescope is composed of an ocular (11), a roof prism (12) and a first objective lens (14). A microscope is composed by adding a second objective lens (22) in front of the first objective lens (14). By operating a lens shifting ring (5), the second objective lens (22) is rotated. A mirror (32) is provided in front of the second objective lens (22). By operating a mirror shifting ring (6), the mirror (32) is rotated. When both the second objective lens (22) and the mirror (32) are at their respective retreated positions, the equipment can be used as a telescope to look in the forward direction. When the mirror (32) alone is at the advanced position, the equipment can be used as a telescope to look laterally. When both the second objective lens (22) and the mirror (32) are at their respective advanced positions so that the light entering from the side can be used, the equipment is capable of magnifying an object (26) to be observed, which is placed on a slide (25) supported by slide insertion slots. When the mirror (32) alone is at the retreated position, the light entering from the front can be used.

2 Claims, 4 Drawing Sheets

… …

OPTICAL EQUIPMENT

TECHNICAL FIELD

The present invention relates to an optical equipment which can be used as a microscope as well as a telescope.

BACKGROUND ART

Conventionally, a detachable attachment which includes an auxiliary lens wherein the attachment can be attached to, for example, the body of a telescope so that the telescope may be used as a magnifier is widely known.

However, an attachment of this type has to be removed from and attached again to the main body of the equipment whenever its usage is switched. Furthermore, it is inconvenient to store and carry.

An attachment of another type is offered in Japanese Utility Model Registration No. 3005217, which relates to an attachment that is capable of changing over its usage between telescope and magnifier by moving its auxiliary lens.

The configuration which calls for removing and re-attaching the attachment for switching its usage between telescope and magnifier presents another problem in that it is not suitable for observation using a prepared slide or the like, because an object to be magnified has to be placed in front of the attachment.

In order to solve the above problems, an object of the present invention is to provide an optical equipment which facilitates changeover of its usage between telescope and magnifier and is also easy to operate when used for microscopic observation.

DISCLOSURE OF INVENTION

The invention comprises an ocular; a first objective lens disposed in front of the ocular; a second objective lens which is disposed in front of the first objective lens and can be selectively shifted between the advanced position where the second objective lens intersects the optical axis of the first objective lens and the retreated position where the second objective lens does not intersect the optical axis of the first objective lens; a holder for supporting an object to be magnified provided in front of the second objective lens; and a mirror which is disposed in front of the holder that supports an object to be magnified, the mirror so disposed as to be selectively shifted between the advanced position where the mirror intersects the optical axis of the first objective lens and the retreated position where the mirror does not intersect the optical axis of the first objective lens. With the configuration as above, the equipment according to the invention can be used as a telescope for looking in the forward direction with its second objective lens and mirror at their respective retreated positions. The equipment can also be used as a telescope for looking laterally with the second objective lens at the retreated position and the mirror at the advanced position. Further, by using the light entering from the side with the second objective lens and the mirror at their respective advanced positions, the equipment can be used as a microscope to observe an object supported by the holder for supporting an object to be magnified. Furthermore, by using the light entering from the front with the second objective lens at the advanced position and the mirror at the retreated position, the equipment can be used as a microscope to observe an object supported by the holder for supporting an object to be magnified.

According to another feature of the invention, the second objective lens and the mirror are capable of rotating between their respective advanced positions and the retreated positions. Therefore, usage of the equipment is speedily changed over in four ways: as a telescope to look in the forward direction, a telescope to look laterally, a microscope using the light entering from the front and a microscope using the light entering from the side.

BEST MODE FOR CARRYING OUT THE INVENTION

Figure 1:
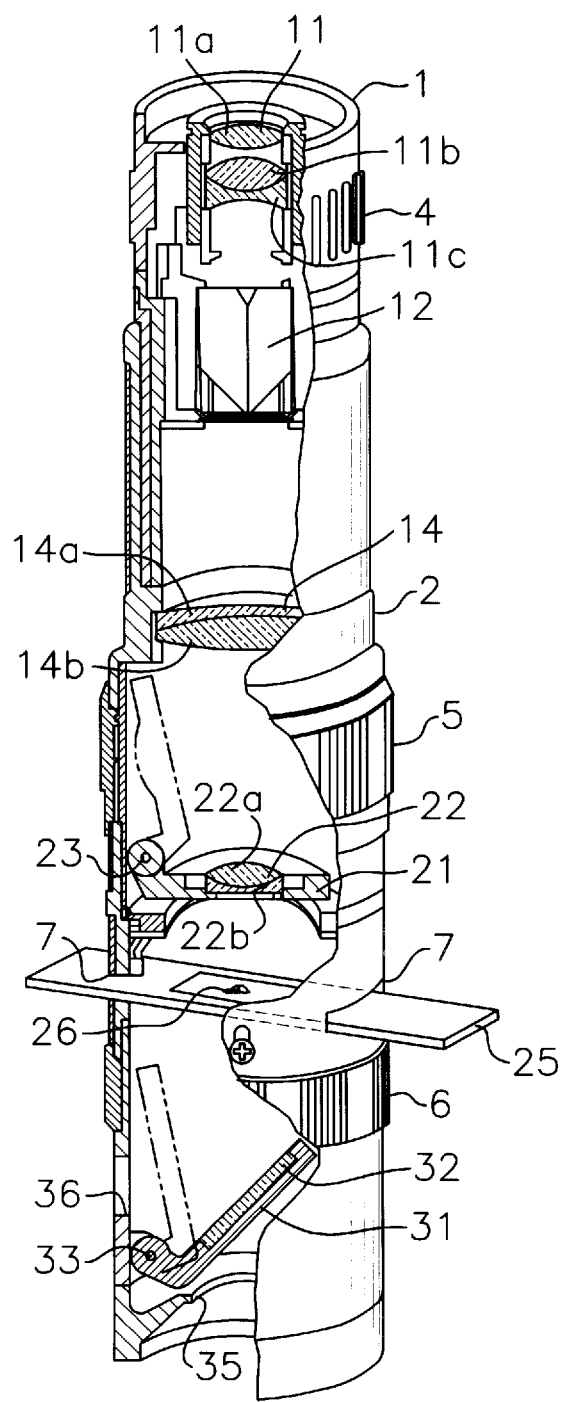
FIG. 1 is a partially cut out structural drawing of an optical equipment according embodiment of the present invention.

Next, the configuration of an optical equipment according to an embodiment of the invention is explained hereunder, referring to the drawings.

Figure 2:
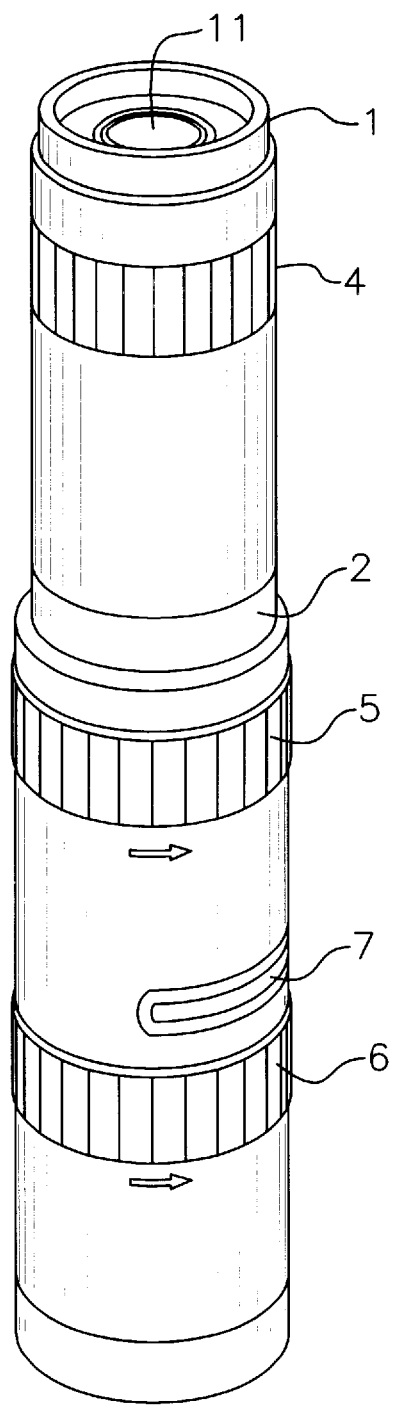
FIG. 2 is an oblique view of said optical equipment.

In FIGS. 1 and 2, numeral 1 denotes an optical equipment, which has an essentially cylindrical lens barrel 2. Rotatably provided around the outer surface of lens barrel 2 are a focusing ring 4, a lens shifting ring 5 and a mirror shifting ring 6, of which focusing ring 4 is disposed near the rear end, i.e. the eyepiece side, of the lens barrel, while lens shifting ring 5 and mirror shifting ring 6 are disposed in front of focusing ring 4, in other words, closer to the objective lens. A pair of slide insertion slots 7,7 are formed between lens shifting ring 5 and mirror shifting ring 6. Being so positioned as to face each other, these slide insertion slots 7,7 serve as a holder for supporting an object to be magnified. Lens shifting ring 5 includes a fine focus adjusting system.

Figure 3:
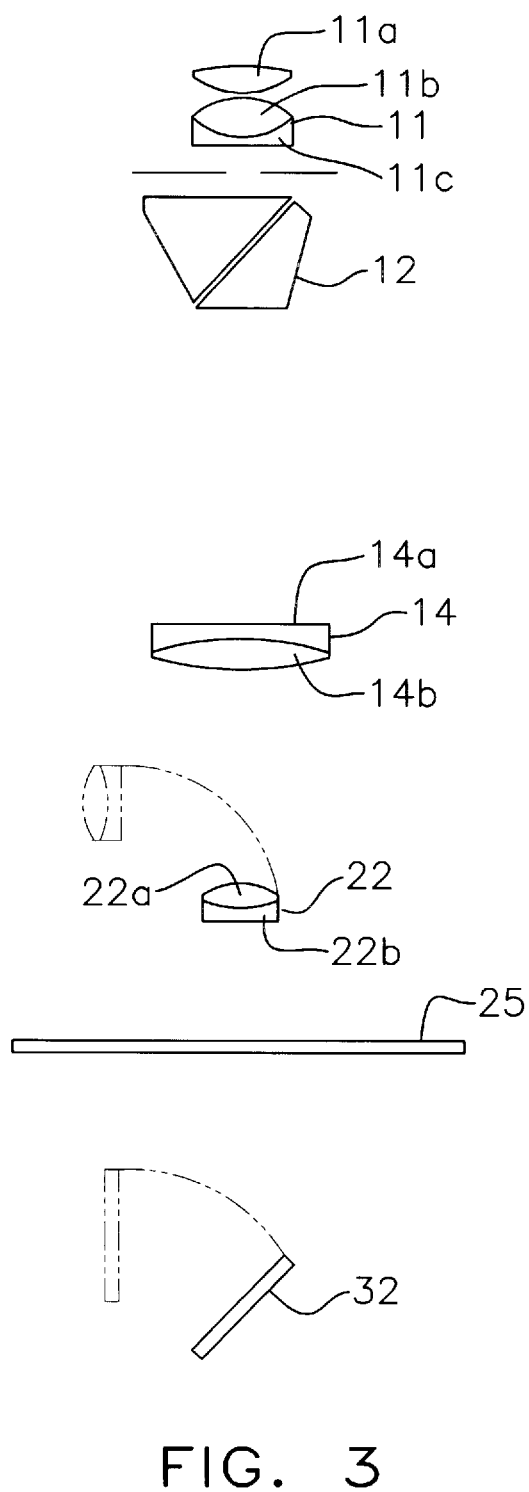
FIG. 3 is a structural drawing of said optical equipment.

As shown in FIGS. 1 to 3, an ocular 11 which consists of three lenses 11a, 11b, 11c is disposed inside lens barrel 2 in such a manner that ocular 11 is moved forward and rearward by rotating focusing ring 4. A roof prism 12 consists of a specified group of lenses, assembled to form an erected optical prism, is provided in front of ocular 11. A first objective lens 14 comprising a plurality of two lenses 14a, 14b is disposed in front of roof prism 12. These components, i.e. ocular 11, roof prism 12 and first objective lens 14, constitute the optical system of a telescope.

Provided in front of first objective lens 14 is a lens holder 21, which supports a second objective lens 22 consisting of two lenses 22a,22b. Lens holder 21 is connected to lens shifting ring 5 through a leaf spring (not shown) or the like and is so supported as to be capable of rotating around shaft portion 23. With the configuration as above, by rotating lens shifting ring 5 in the forward or reverse direction, lens holder 21 is rotated so that the position of the lens is shifted between the advanced position where the optical axis of first objective lens 14 matches the optical axis of second objective lens 22 and the retreated position where lens holder 21 and second objective lens 22 are retreated from the optical axis of first objective lens 14.

The optical system of a telescope is constituted by adding the second objective lens 22 to ocular 11, roof prism 12 and first objective lens 14 and it can magnify the image of an object 26 on a slide 25 which has been inserted through slide insertion slot 7,7.

A mirror holder 31 having a mirror 32 attached to the back surface thereof is provided in front of slide insertion slots 7,7. Mirror holder 31 is attached through a leaf spring (not shown) or the like to mirror shifting ring 6 in such a manner as to be able to rotate around a shaft portion 33. With the configuration as above, by rotating mirror shifting ring 6 in the forward or reverse direction, mirror holder 31 is rotated so that the position of the mirror is shifted between the advanced position, where mirror 32 intercepts at an angle of approximately 45° the optical axes of first and second objective lenses 14,22, and the retreated position, where mirror holder 31 is retreated from the optical axes of those optical systems.

When mirror holder 31 is at the retreated position, a ray of light incident from a front aperture 35 formed at the front part of lens barrel 2 is introduced to the optical system. On the other hand, when mirror holder 31 is at the advanced position, a ray of light incident from a side aperture 36 formed at the side part of lens barrel 2 is reflected approximately 90° before being introduced to the optical system.

As described above, the embodiment of the present invention can be used as a telescope to look in the forward direction with second objective lens 22 and mirror 32 at the retreated position, and also as a telescope to look laterally with second objective lens 22 at the retreated position and mirror 32 at the advanced position. With both second objective lens 22 and mirror 32 at the advanced position to make use of light introduced from the side of the lens barrel, the embodiment can also be used as a microscope to magnify the image of an object 26 on a slide 25 which has been inserted through slide insertion slots 7,7. When second objective lens 22 and mirror 32 are respectively at the advanced position and the retreated position, the embodiment can be used as a microscope to observe object 26 on slide 25 by using the light entering from the front.

According to the invention, second objective lens 22 and mirror 32 are supported in such a manner as to be capable of rotating between their respective advanced and retreated positions, and lens holder 21 and mirror holder 31 that support second objective lens 22 and mirror 32 are respectively attached to lens shifting ring 5 and mirror shifting ring 6. Therefore, by operating lens shifting ring 5 and mirror shifting ring 6, the equipment may be used as a telescope to look in the forward direction, a telescope to look laterally, a microscope using the light entering from the front or a microscope using the light entering from the side.

Figure 4:
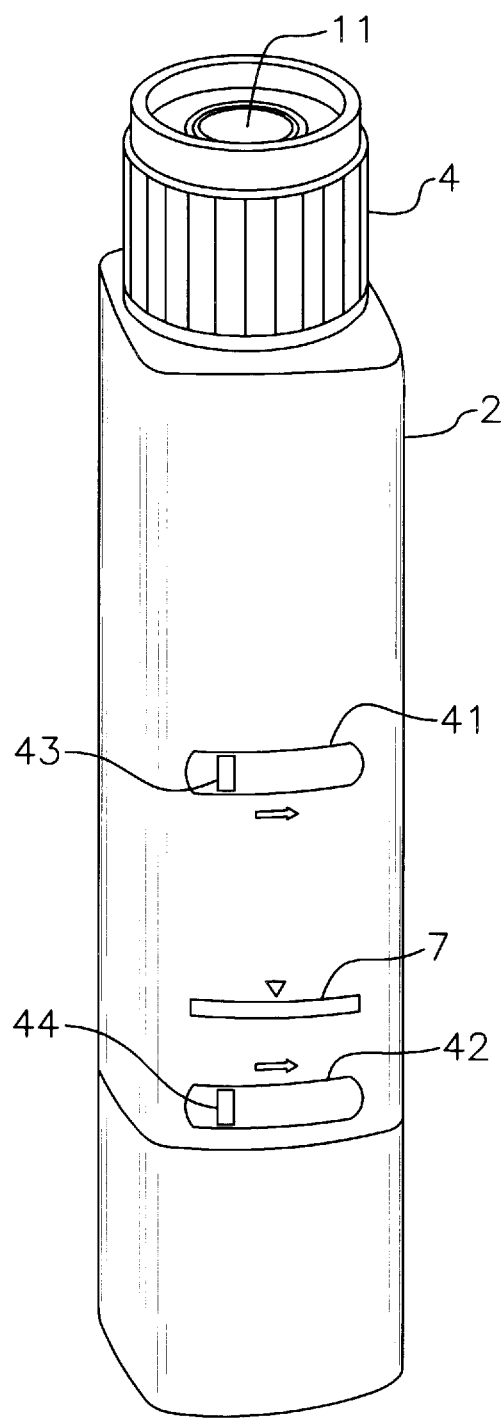
FIG. 4 is an oblique view of an optical equipment according to another embodiment of the present invention.

Another embodiment of the present invention is shown in FIG. 4, wherein a lens barrel 2 having an essentially rectangular tube-like shape is provided with a pair of grooves 41,42 arranged in the fore-and-aft direction and shifting levers disposed in grooves 41,42, the shifting levers consisting of a lens shifting lever 43 and mirror shifting lever 44 that respectively rotate second objective lens 22 and mirror 32.

INDUSTRIAL APPLICABILITY

As described above, an optical equipment according to the invention is convenient to carry around when a telescope and a microscope are both needed.

I claim:

1. An optical equipment comprising:

an ocular;

a first objective lens disposed in front of said ocular;

a second objective lens which is disposed in front of said first objective lens and can be selectively shifted between an advanced position where said second objective lens intersects the optical axis of said first objective lens and a retreated position where said second objective lens does not intersect the optical axis of said first objective lens;

a first shifting ring means for selectively shifting said second objective lens between said advanced position and said retreated position;

a holder provided in front of said second objective lens to support an object to be magnified;

a mirror which is disposed in front of said holder that supports an object to be magnified, said mirror so disposed as to be selectively shifted between an advanced position where said mirror intersects the optical axis of said first objective lens and a retreated position where said mirror does not intersect the optical axis of said first objective lens; and a second shifting ring means for selectively shifting said mirror between said advanced position and said retreated position.

2. An optical equipment as claimed in claim 1, wherein said second objective lens and said mirror are capable of rotating between their respective advanced positions and the retreated positions.

* * * * *